No. 618,122. Patented Jan. 24, 1899.
J. L. NELSON.
BEVERAGE MIXER.
(Application filed Nov. 16, 1896.)
(No Model.) 2 Sheets—Sheet 1.
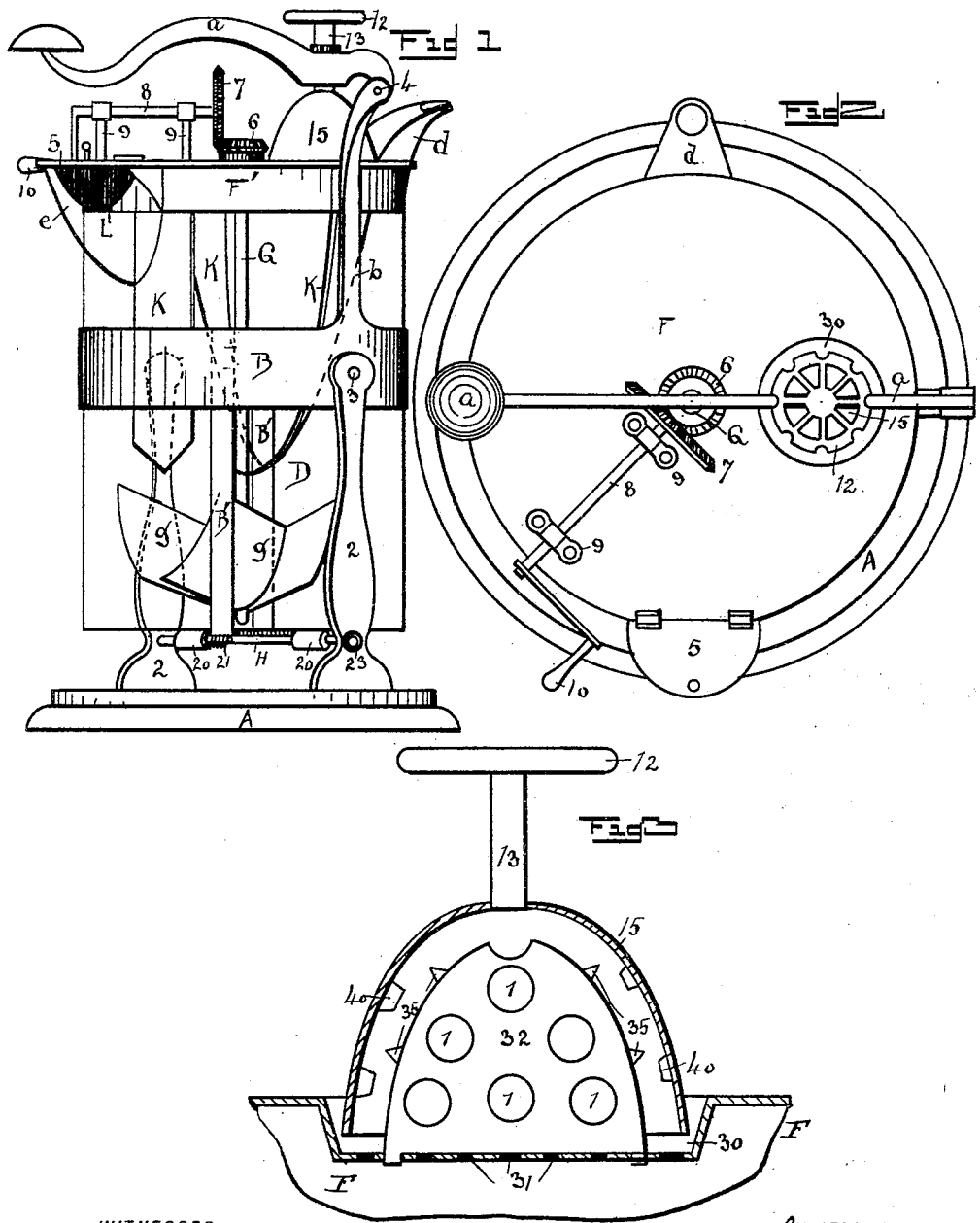
WITNESSES:
INVENTOR
John L. Nelson
BY
ATTORNEY.

No. 618,122. Patented Jan. 24, 1899.
J. L. NELSON.
BEVERAGE MIXER.
(Application filed Nov. 16, 1896.)
(No Model.) 2 Sheets—Sheet 2.
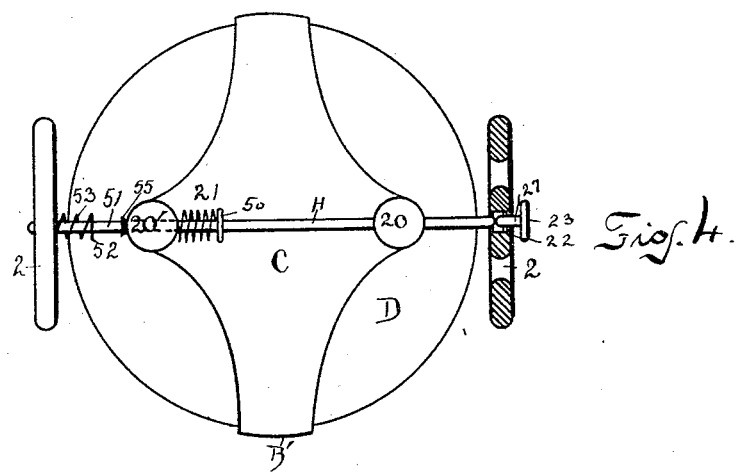
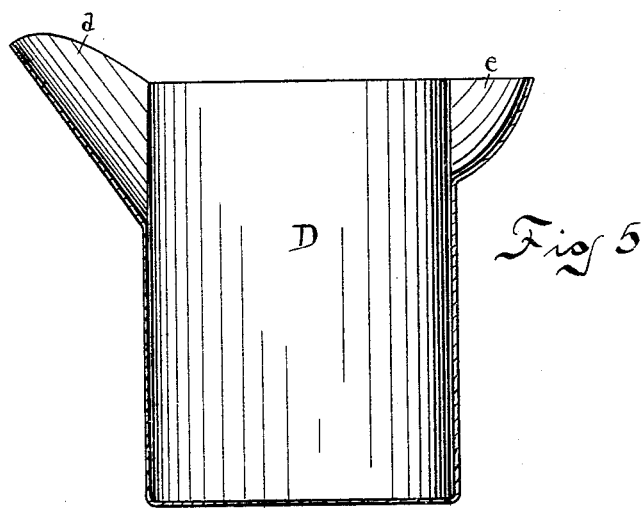

UNITED STATES PATENT OFFICE.

JOHN L. NELSON, OF OMAHA, NEBRASKA.

BEVERAGE-MIXER.

SPECIFICATION forming part of Letters Patent No. 618,122, dated January 24, 1899.

Application filed November 16, 1896. Serial No. 612,399. (No model.)

*To all whom it may concern:*

Be it known that I, JOHN LEON NELSON, residing at Omaha, in the county of Douglas and State of Nebraska, have invented certain useful Improvements in Beverage-Mixers; and I do hereby declare that the following is a full, clear, and exact description of the invention, such as will enable others skilled in the art to which it appertains to make and use the same, reference being had to the accompanying drawings, which form a part of this specification.

This invention relates to an improvement in beverage-mixers, my object being to provide a beverage-mixer that shall be in the shape of a vending-urn and so arranged that the beverage, such as lemonade or analogous drinks, can be made in sight of the purchaser and speedily mixed preparatory to being served.

In the accompanying drawings, Figure 1 shows a perspective of a beverage-mixer embodying my invention. Fig. 2 shows a top view thereof. Fig. 3 shows a detached broken enlarged view of the lemon-squeezer as used in my invention. Fig. 4 shows a bottom view, with the base-plate removed, of my vending-urn, while Fig. 5 shows a sectional view of the glass or other suitable jar or jug used in conjunction with my beverage-mixer.

My invention comprises, essentially, a base-plate A, from which extend two standards 2 2, which standards above support a rim B, in which rim extends a bottom C, (shown in Fig. 4,) connected to the rim B by means of two straps B'. This rim B is pivotally suspended between the straps and is in turn provided with an upward-extending stem $b$, to which is secured by means of the pin 4 a pivoted lever $a$, as is also shown in Fig. 2.

Closing a jug or jar D, of glass or other suitable material, is a top F, provided with a rim F', so that this top snugly fits upon the jar D. This top F is provided at one point with a hinged extension 5, to the bottom of which is secured a knife L, (shown in Fig. 1,) and this knife comes within an outward extension $e$ of the jar D, as is shown. From a point opposite extends a spout $d$. The top F closes the jar, and the hinged section 5 is raised in filling the jar D in the preparation of lemonade and other beverages.

In the preparation of lemonade the jar D would be provided with a suitable quantity of cracked ice and water, the necessary sugar, lemon, and flavoring materials being placed into the jar through the opening $e$, the knife L being used in cutting the lemon. The top F is further provided with a depression 30, the bottom of which is provided with the perforations 31, and within which depression is held a receiver 32, provided with suitable openings 1 and outwardly-extending pins 35, upon which receiver a half-lemon section would be placed. At a point above this receiver 32 is an inverted-cup-shaped holder 15, provided with a stem 13 and an operating-wheel 12, and which top is further provided with a series of inwardly-extending nibs 40, this holder forming part of and being rotatably held within the lever $a$. The lemon having been placed upon the receiver 32, this cup-shaped holder would be carried downward by virtue of the lever $a$ to force the lemon over the receiver 32 until the cup 15 was in place, when this cup would be revolved, which would in turn revolve the lemon, so that the pulp would be cut by the projection 35 and feed through the openings 1 and from there drop into the receptacle through the openings 31. By this turning movement of the lemon-section all of the lemon-pulp is forced out of the shell, which clings to the outer cup 15, the seeds readily entering through the enlarged openings 1, but only the inner pulp particles escape into the receptacle. This device 32 is in fact a lemon-shredder and can be readily removed, so that the seeds can be taken away, as well as the depression 30 thoroughly cleaned. After the proper ingredients have been added and placed into the jar the whole is agitated by the action of a series of wings $g$, which are secured to a suspended shaft G, passing centrally through the top F, and which shaft above is provided with a small gear 6, meshing with a larger gear 7 upon the shaft 8, in turn actuated by a handle 10 and supported by the bearings 9 9. These agitators would have a tendency to cause the whole fluid within the jug to revolve, and in order to cause an agitation therein and of the fluid I provide the curved plates K, which depend from the top F and against which the revolving fluid is forced to cause a back current and thorough agitation of the mixture. The use of the glass jug enables the purchaser to see how his beverage is being prepared and so is enabled to determine whether or not proper and pure ingredients are employed. After the beverage is thoroughly mixed it is ready to be served through the spout $d$. Normally this jar D is held in a vertical locked position, which is accomplished by means of a spring-stem H, which works through two bearings 20 20, secured to the bottom C. This stem H is provided with a shoulder 50, between which and one of the bearings 20 is held an ordinary expansion-spring 21, so that the stem H is normally forced in an outward direction. The bearing 20' in addition to receiving an end of the stem H is provided upon the opposite side with an enlarged opening, into which is adapted to work the chronicle end 55 of the bar 51, which bar is provided with a shoulder 52, between which and the bracket 2 is held an expansion-spring 53, so that this bar 51 is normally forced in an outward direction and whenever the jar D is in a vertical position will lock into the seating within this bearing 20', and which seating is a continuation of the opening adapted to receive the bar H. By this means whenever the jar is swung vertically the bar 51 finds a seating within this opening, as does also the bar H within an opening of the bearing 2.

To unlock the device in vending the beverage, it is simply necessary to press in the button 23, which is provided with a stem 27, having a pin 22, so that this button cannot be drawn outward, and which pin 22 works within a suitable opening of the standards 2, which opening also accommodates the end of the bar H. Now this inward pressing of the button 23 carries the rod H in an opposite direction, so that its own forward end slips out of its seating, while the rear end of the bar H forces outward the bar 51, so that the urn can be swung in pouring out the beverage. As soon as the button is released again the bar H, as well as the bar 51, is again carried forward, so that as the device is brought into a vertical position they promptly snap into their respective seatings.

The device is neat and can be readily operated, and,

Having thus described my said invention, what I claim as new, and desire to secure by United States Letters Patent, is—

1. The combination, of a swinging holder, a support for said holder, a seating within said support, a spring-actuated bar secured to said swinging holder, said bar being adapted to work into said seating, and a push-button adapted to receive the impact of said bar when seated, substantially as set forth.

2. The combination, of a swinging holder, a support for said holder, a seating within said support, a spring-actuated bar secured to said swinging holder, said bar being adapted to work into said seating, a seating for said bar secured to said holder, a spring-actuated stem working within said support and adapted to work against one end of said spring-actuated bar and within said seating, and a push-button working within said support and adapted to receive the impact of said bar, said bar being adapted to come in contact with said stem, as and for the purpose set forth.

3. In a beverage-mixer, the combination of a reservoir provided with an outwardly-extending spout, a hinged top covering said outward extension, and a knife depending from said hinged top, said knife being hidden when not in use, as and for the purpose set forth.

In testimony whereof I affix my signature in presence of two witnesses.

JOHN L. NELSON.

Witnesses:
ANE M. ELKJER,
GEO. W. SUES.